Feb. 13, 1951   B. C. FLEMING-WILLIAMS   2,541,230
OSCILLATION GENERATOR
Filed Feb. 24, 1948
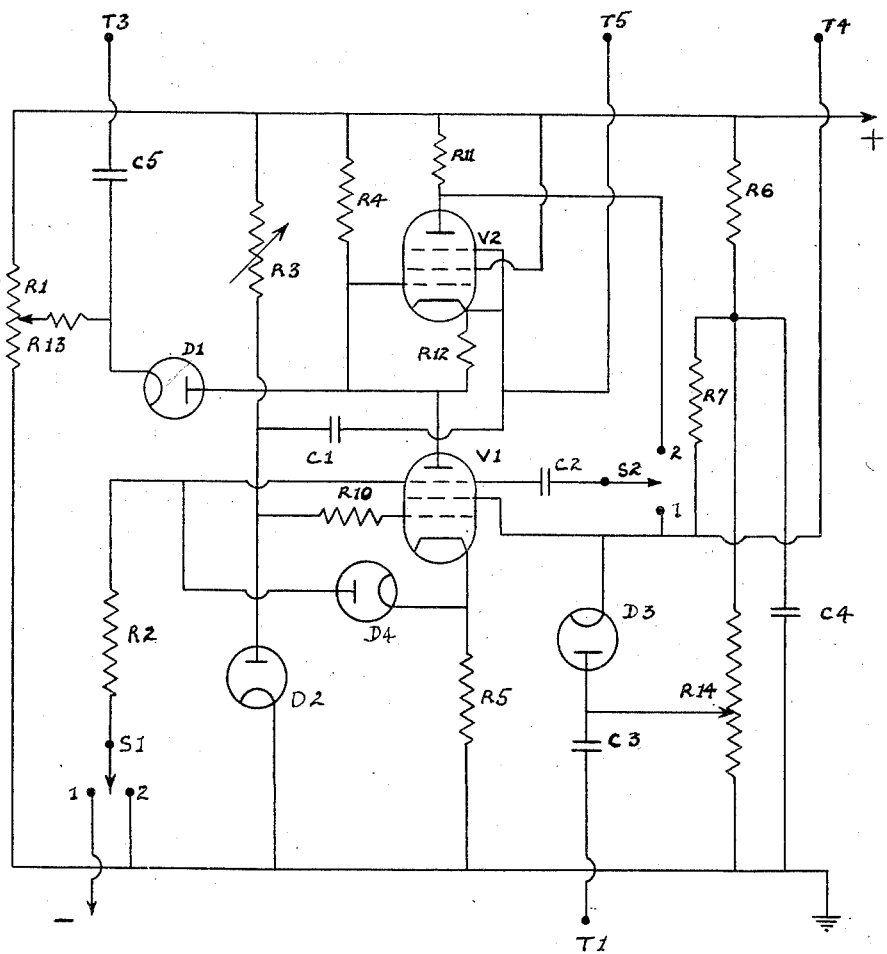
INVENTOR
Brian C. Fleming-Williams
By Ralph B. Stewart
Attorney Patented Feb. 13, 1951

2,541,230

UNITED STATES PATENT OFFICE 2,541,230

OSCILLATION GENERATOR

Brian Clifford Fleming-Williams, London, England, assignor to A. C. Cossor Limited, London, England, a British company Application February 24, 1948, Serial No. 10,387
In Great Britain January 25, 1945

Section 1, Public Law 690, August 8, 1946
Patent expires January 25, 1965

8 Claims. (Cl. 250—36)

This invention relates to thermionic valve circuits suitable for generating potential sweeps which are linear with time and/or potential waves of square-wave form.

The principal object of this invention is to provide an improved circuit for either or both of these purposes.

The accompanying drawing shows, by way of example only, a circuit diagram of an arrangement embodying the invention in preferred form.

In this arrangement a ganged pair of switches S1, S2 is provided to change over, as required, between two alternative modes of operation. With switches S1, S2 both in position 1, the apparatus generates in response to the application of a firing pulse, a single linear voltage sweep followed by a rapid automatic return; and it will then be ready to repeat this performance at any time in response to a further firing pulse. At the same time, a single square-wave cycle of potential is generated at another output terminal. With the switches both in position 2, however, the apparatus operates as a self-running generator.

The principal valve V1 is a pentode which may be of the VR. 116 or Mazda AC/SP1 type. The cathode of pentode V1 is connected to earth through a biasing resistor R5. The control grid of pentode V1 is coupled to a point in the anode circuit of pentode V1 by a condenser C1, and is also connected through a high resistance R3 to the positive line, which may be at 300 volts to earth, preferably stabilized. A small stopper resistance R10 is connected in the lead to the control grid to prevent parasitic oscillations. A diode D2 having its cathode connected to earth prevents the potential of the control grid of pentode V1 from rising appreciably above that of earth.

The anode of pentode V1 is connected to the positive line through an anode load comprising two parallel paths. One of these paths consists of resistor R4. The other path consists of the space path of a second pentode V2, in series with resistors R11, R12. The anode of pentode V1 is also connected through diode D1 and resistor R13 to the slider of a potentiometer R1, which is itself connected between the positive line and earth. This diode circuit prevents the potential of the anode of pentode V1 from rising appreciably above the potential selected by the slider of potentiometer R1.

When the switch S2 is in position 1, the screen and suppressor of pentode V1 are coupled by a condenser C2. The screen current is derived from the positive line through resistors R6 and R7, the voltage across resistor R6 being smoothed by condenser C4 to earth. The suppressor is biased through resistor R2 from a source which may be about 15 volts negative to earth, the switch S1 being in position 1.

A diode D4, connected between the suppressor and cathode of pentode V1, is provided to prevent the suppressor potential from rising appreciably above that of the cathode.

Provision is made for firing alternatively by either positive or negative pulses. Terminal T3, for the application of negative firing pulses, is coupled to the cathode of diode D1 through condenser C5. Terminal T1, for the application of positive firing pulses, is coupled to the anode of diode D3 through condenser C3. The anode of diode D3 is biased from the slider of potentiometer R14, the voltage across which is smoothed by condenser C4.

The manner of operation of the circuit with both switches in position 1 will now be described.

The circuit has a stable condition with the anode of pentode V1 approximately at the potential of the slider of potentiometer R1 and with the suppressor at the potential of its bias source: the whole of the cathode current of pentode V1 is then flowing to its screen, the control grid is held approximately at earth potential by diode D2, and the potential between cathode and control grid is therefore determined by resistor R5.

In this stable condition of the circuit, cathode current in the other pentode V2 is kept down to a fraction of a milliamp. This low current sets up a voltage drop across resistor R12, which holds the control grid of this pentode sufficiently negative to limit its current. The total current through diode D1 is made up of this small current together with current of comparable magnitude flowing along the parallel path through resistor R4.

Suppose that a negative pulse is now applied at terminal T3: then the potential of the anode of pentode V1 will fall. So also will the potential of the control grid of pentode V2 and hence that of its cathode. Owing to the coupling through condenser C1 between the cathode of pentode V2 and the control grid of pentode V1, this latter control grid is driven negative, with the result that diode D2 is cut off and the cathode current of pentode V1 is reduced. The potential of the screen of pentode V1 therefore rises; and owing to its coupling through condenser C2, it carries the suppressor potential with it. Anode current then begins to flow in pentode V1 causing a further lowering of the potentials of the anode of pentode V1, and of the control grid and the cathode of pentode V2, the effect is cumulative and proceeds extremely rapidly until a meta-stable state is reached in which the anode current of pentode V1 is approximately the sum of the currents through resistors R3 and R4. The condenser C1 is now being discharged through the anode-cathode path of pentode V1 and through resistor R12, and the current through this resistor is now more than sufficient to cut off pentode V2 completely.

During the change from the stable to the meta-stable state, the fall of potential of the anode of pentode V1 is not more than about 6 volts, while that of the cathode of pentode V2 and that of the control grid of pentode V1 are each only about 3 volts. At the same time the rise of screen potential of pentode V1 may be about 60 volts. Its suppressor is however, prevented by diode D4 from rising appreciably above cathode potential, and the condenser C2 therefore becomes charged. This charge subsequently leaks away slowly through resistor R2, but may leave the suppressor with considerably more negative bias at the time of arrival of the next firing pulse than is provided by its negative bias source alone. The suppressor is therefore to some extent automatically biased and so the actual value of negative bias voltage applied is not very critical.

During the meta-stable regime the anode potential of pentode V1 will make a linear sweep downward, while its control grid potential makes a substantially linear sweep upward across a small portion of its grid base. The velocities of these potential sweeps are determined by the values of resistor R3 and condenser C1. The discharging rate of condenser C1 will approximately correspond to the discharging rate which it would have if connected in series with a resistance of value G times R3 across a direct voltage source of value G times the voltage of the positive line, G being the gain of pentode V1 as an amplifier in the present circuit with pentode V2 cut off. While these sweeps of the anode and control grid potentials of pentode V1 proceed, the potential of its screen will remain approximately constant; and therefore that of its suppressor also, because the time constant C2R2 is long relative to the duration of the sweep.

The termination of the meta-stable regime will occur automatically when the anode of pentode V1 has reached a very low potential; because its anode current rapidly falls, and so its screen current increases, with the result that screen and suppressor potentials both fall. The anode current of pentode V1 is then cut off, and the potential drop across resistor R12 vanishes. Pentode V2 immediately becomes highly conductive; and condenser C1 is rapidly charged through resistor R11, the anode-cathode path of pentode V2 and diode D2. The potential of the control grid of pentode V1 rises to earth potential, and the resulting increase of screen current brings screen and suppressor potentials down further. Diode D2 prevents the potential of the control grid of pentode V1 from rising above earth potential. When the anode potential of pentode V1 reaches that of the slider on potentiometer R1, the stable condition is again established and the circuit is again ready for operation in response to a firing pulse. It will be evident that the potential selected by the slider on potentiometer R1 sets the amplitude of the potential sweep of the anode of pentode V1, independently, of the velocity thereof.

If the firing is effected by a positive pulse applied to the screen of pentode V1 from terminal T1, the transition from the stable to the meta-stable condition will proceed, as soon as diode D3 has become conductive, as the result of the same cumulative effects as have been described for a negative firing pulse applied to the anode of pentode V1 from terminal T3.

If the slider of potentiometer R14 is adjusted so that the potential to which the anode of diode D3 is biased is equal to the potential assumed by the screen of pentode V1 during the stable regime, then a firing pulse of small amplitude will suffice. This arrangement provides the facility, however, of applying an adjustable additional bias to the anode of diode D3, so that the firing pulse must overcome that additional bias before it can take effect. Further, when such an additional bias is employed, the condenser C3 becomes further charged by the current which flows through diode D3 in response to an adequate firing pulse; and this additional charge has the effect of biassing the anode of diode D3, for a period after firing, still further than the potential of the slider of potentiometer R14. This additional bias gradually falls away as condenser C3 discharges through potentiometer R14, but while it subsists it establishes the condition that a firing pulse of still greater amplitude would be necessary to re-fire the circuit.

Diodes D1 and D3 serve, during the meta-stable regime, to isolate the generator circuit under consideration from the circuits (not shown) connected to terminals T3 and T1 which provide the firing pulses.

If it is desired to obtain linear potential sweeps as output from the circuit, these may be taken from terminal T5 connected to the cathode of pentode V2. If a square-wave of potential is desired, this may be taken from terminal T4 connected to the screen of pentode V1. The form of the wave front of the square-wave is identical with that of the upper part of a positive firing pulse applied at terminal T1, provided that this pulse rises rapidly. The screen of valve V1 is at a low potential during the cut off period of this valve, whereas the anode of valve V2 is at a low potential only during flyback. Hence a square wave of potential having the same frequency as, but of different length from, that obtained at T4 is available by taking a tapping from the anode of valve V2.

With ganged switches S1 and S2 in position 2, the operation of the circuit is similar to that which has been described for position 1, with the exceptions that will now be described.

The meta-stable regime is terminated in the following manner. When the anode of pentode V1 has reached a very low potential, its anode current falls off, with the result that the potential drop across resistor R12 falls off, pentode V2 begins to conduct, and the potential of the anode of pentode V2 falls. By virtue of the coupling of this anode through condenser C2 to the suppressor of pentode V1, the potential of this suppressor is lowered and the anode current of pentode V1 is further reduced. This effect is cumulative, and anode current through pentode V1 is therefore completely cut off very quickly.

Condenser C1 now recharges rapidly through the anode-cathode path of pentode V2 as described for switch position 1. As soon as this charging is completed, the potential of the anode of pentode V2 rises again, and therefore likewise that of the suppressor of pentode V1; and anode current begins to flow in pentode V1. This flow of anode current leads to the initiation of the meta-stable regime again, and a further sweep begins without the need for a firing pulse.

Automatic bias of the suppressor of pentode V1 does not occur with the switches in position 2, because the rise of potential of the screen of pentode V1 does not lead to a similar rise of suppressor potential, with consequent heavy suppressor grid current or current through diode D4.

It will therefore be seen that with the switches S1 and S2 both in position 2, a free-running time-base is provided, giving linear potential sweeps at output terminal T5, while a square-wave of potential in synchronism therewith appears at output terminal T4 or on the anode of V2. Synchronization of this time-base may be effected by the application of either positive or negative synchronising pulses. Positive synchronising pulses will be applied through terminal T1 to terminate the meta-stable regime somewhat earlier than it is naturally terminated when the time-base is free-running. Negative synchronising pulses, on the other hand, will be applied through terminal T3 to limit the amplitude of the charging of condenser C1, and therefore to initiate the meta-stable regime somewhat earlier than it is naturally initiated when the time-base is free running.

The following table gives a set of values for the various components of the circuit, suitable for use for generating linear potential sweeps and square-waves of potential having durations of the order of 500 microseconds.

V1 = VR. 116 or Mazda AC/SP1
V2 = VR. 65 or Mazda SP. 41
R1 = 50 kilohms (potentiometer)
R2 = 100 kilohms
R3 = 1.4 megohms (maximum)
R4 = 1 megohm
R5 = 200 ohms
R6 = 10 kilohms
R7 = 5 kilohms
R10 = 500 ohms
R11 = 22 kilohms
R12 = 50 kilohms
R13 = 22 kilohms
R14 = 50 kilohms (potentiometer)
C1 = 0.0005 microfarad
C2 = 0.0005 microfarad
C3 = 0.01 microfarad
C4 = 2 microfarads
C5 = 0.00005 microfarad By appropriate alteration of the values of components, the duration of the generated potential sweeps and square-wave may be substantially shortened, or may be lengthened to the order of several seconds.

I claim:

1. A circuit for generating saw-tooth and square-wave oscillations, each cycle of said saw-tooth oscillations including a substantially linear potential sweep and a flyback, said circuit comprising a first thermionic valve having a cathode, an anode, and a control grid, a capacitor connected between said anode and control grid, an impedance element for discharging said capacitor substantially linearly with fall of voltage at said anode during said sweeps, and an anode load for said first valve, said anode load comprising a second impedance element in parallel with a circuit including a second thermionic valve in series with a resistor, said resistor being connected between the cathode of said second valve and said anode.

2. A circuit for generating saw-tooth and square-wave oscillations, each cycle of said saw-tooth oscillations including a substantially linear potential sweep and a flyback, said circuit comprising a first thermionic valve having a cathode, an anode, and a control grid, a capacitor connected between said anode and control grid, an impedance element for discharging said capacitor substantially linearly with fall of voltage at said anode during said sweeps, a terminal for the application of negative-going firing pulses to initiate said potential sweep, a connection between said terminal and said anode, and an anode load for said first valve, said anode load comprising a second impedance element in parallel with a circuit including a second thermionic valve in series with a resistor, said resistor being connected between the cathode of said second valve and said anode.

3. A circuit for generating saw-tooth and square-wave oscillations, each cycle of said saw-tooth oscillations including a substantially linear potential sweep and a flyback, said circuit comprising a first thermionic valve having a cathode, an anode, a control grid and a screen grid, a differentiating network coupling said anode and said control grid, an impedance element connected as anode load to said first valve, a second thermionic valve having a cathode, an anode, a control grid and a screen grid connected with its anode-cathode path in shunt with said impedance element, a terminal for the application of positive-going firing pulses to initiate said potential sweep, a connection between said terminal and the first-named screen grid, and connections to render said anode-cathode path of high impedance during said sweeps and of low impedance during said flybacks.

4. A circuit for generating saw-tooth and square-wave oscillations, each cycle of said saw-tooth oscillations including a substantially linear potential sweep and a flyback, said circuit comprising a first thermionic valve having a cathode, an anode, a control grid, a screen grid, a suppressor grid and an anode, a differentiating network coupling said anode and said control grid, an impedance element connected as anode load to said first valve, a second thermionic valve having a cathode, an anode, and a control grid connected with its anode-cathode path in shunt with said impedance element, connections to render said anode-cathode path of high impedance during said sweeps and of low impedance during said flybacks and a two-position switch for connecting said suppressor grid through a condenser with the first switch position, to said screen grid and, with the second switch position, to the anode of said second valve.

5. A circuit according to claim 4 including a second two-position switch ganged to the first-named switch for connecting said suppressor grid to points at negative potentials relatively to the cathode of said first valve, the said point with the said first switch position being more negative than with the said second switch position.

6. A circuit for generating saw-tooth and square wave oscillations, each cycle of said saw-tooth oscillations including a substantially linear potential sweep and a flyback, said circuit comprising a first thermionic valve having an anode, a cathode and at least three control electrodes, a first of said control electrodes being nearest said cathode, a second being between said first control electrode and said anode and the third being nearest said anode, a voltage source having positive and negative terminals, a connection from said cathode to the negative terminal of said source, a differentiating network comprising two resistors and a capacitor, a first of said resistors being connected between said anode and one terminal of said capacitor, the second of said resistors being connected between said other terminal of said capacitor and said positive terminal of said source, a connection from said other terminal of said capacitor to said first control electrode, an anode load resistor included in a connection between said anode and said positive terminal, a second thermionic valve having an anode, a cathode and at least one control electrode, a connection from the anode of said second valve to said positive terminal, said control electrode of said second valve being connected to said anode of said first valve, and said cathode of said second valve being connected to said one terminal of said capacitor.

7. A circuit as claimed in claim 6 and including means biasing said third control electrode of said first valve negatively relatively to the cathode of said first valve and a further capacitor connected between the second and third control electrodes of said first valve.

8. A circuit as claimed in claim 6, and including a further capacitor connected between said third control electrode of said first valve and the anode of said second valve.

BRIAN CLIFFORD FLEMING-WILLIAMS.

REFERENCES CITED

The following references are of record in the file of this patent:

UNITED STATES PATENTS

| Number | Name | Date |
|---|---|---|
| 2,412,485 | Whiteley | Dec. 10, 1946 |